(12) United States Patent
Åkesson et al.

(10) Patent No.: US 11,949,524 B2
(45) Date of Patent: Apr. 2, 2024

(54) METHODS AND SYSTEMS FOR AUTOMATED QUOTA DETERMINATION BASED ON RESOURCE SELECTION IN ONLINE CHARGING SYSTEMS

(71) Applicant: Telefonaktiebolaget LM Ericsson (publ), Stockholm (SE)

(72) Inventors: Gustav Åkesson, Ramdala (SE); Simon Norberg, Karlskrona (SE); Sumit Singhal, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 16/954,134

(22) PCT Filed: Dec. 21, 2017

(86) PCT No.: PCT/EP2017/083991
§ 371 (c)(1),
(2) Date: Jun. 15, 2020

(87) PCT Pub. No.: WO2019/120531
PCT Pub. Date: Jun. 27, 2019

(65) Prior Publication Data
US 2020/0374144 A1   Nov. 26, 2020

(51) Int. Cl.
*H04L 12/14* (2006.01)
*H04M 15/00* (2006.01)
*H04W 4/24* (2018.01)

(52) U.S. Cl.
CPC ...... *H04L 12/1407* (2013.01); *H04L 12/1435* (2013.01); *H04M 15/66* (2013.01);
(Continued)

(58) Field of Classification Search
CPC . H04L 12/14; H04L 12/1403; H04L 43/0876; H04L 12/1407; H04L 47/24;
(Continued)

(56) References Cited

U.S. PATENT DOCUMENTS 8,472,379 B2   6/2013  Ishii et al.
10,547,497 B1 *  1/2020  Mostafa ............... H04M 15/64
(Continued)

FOREIGN PATENT DOCUMENTS

CN   102487323 A   6/2012
CN   103577268 A   2/2014
(Continued)

OTHER PUBLICATIONS

International Search Report and Written Opinion of the International Searching Authority for PCT International Application No. PCT/EP2017/083991 dated Sep. 11, 2018.
(Continued)

*Primary Examiner* — Nam T Huynh
(74) *Attorney, Agent, or Firm* — Sage Patent Group

(57) ABSTRACT

Systems and methods are provided for granting service units associated with a charging session for providing network service to an end user. The method includes receiving a request message for the network service; selecting one or more offerings associated with the received request message prior to applying quota determination rules, where each offering includes one or more associated resources. The method further includes applying quota determination rules to the selected one or more offerings based on the associated resources, and rating the service request based on the selected one or more offerings and the results of applying the quota determination rules, where the rating results in an assigned quota. The method further includes transmitting the assigned quota for the requested service, where the assigned quota includes the granted service units.

24 Claims, 12 Drawing Sheets

(52) U.S. Cl.
CPC ... *H04M 15/8214* (2013.01); *H04M 15/8228* (2013.01); *H04W 4/24* (2013.01); *H04M 15/64* (2013.01)

(58) Field of Classification Search
CPC ............ H04L 12/1435; H04L 41/5003; H04M 15/64; H04M 15/58; H04M 15/8228; H04M 15/00; H04M 15/66; H04M 15/853; H04M 15/785; H04M 15/80; H04M 15/854; H04W 4/24
See application file for complete search history.

(56) References Cited

U.S. PATENT DOCUMENTS

| | | |
|---|---|---|
| 2011/0044353 A1 | 2/2011 | Foottit et al. |
| 2012/0210003 A1 | 8/2012 | Castro et al. |
| 2013/0016624 A1 | 1/2013 | Li et al. |
| 2019/0182838 A1* | 6/2019 | Bondarenko ....... H04M 15/785 |

FOREIGN PATENT DOCUMENTS

| | | | |
|---|---|---|---|
| CN | 103929316 A | | 7/2014 |
| CN | 107027109 A | * | 8/2017 ............ H04M 15/64 |
| WO | 2014108801 A1 | | 7/2014 |

OTHER PUBLICATIONS

ETSI TS 132 299 V14.5.0, "Digital cellular telecommunications system (Phase 2+) (GSM); Universal Mobile Telecommunications System (UMTS); LTE; Telecommunications management; Charging management; Diameter charging applications (3GPP TS 32.299 version 14.5.0 Release 14)," Oct. 2017, 206 pages.

3GPP TS 32.299 V13.10.0, "3rd Generation Partnership Project; Technical Specification Group Services and System Aspects; Telecommunication management; Charging management; Diameter charging applications (Release 13)," Technical Specification, Jan. 2018, 193 pages.

First Office Action for Chinese Patent Application No. 201780098313.7 dated Oct. 10, 2022 (12 pages).

* cited by examiner

FIG. 2
(Background Art)

METHODS AND SYSTEMS FOR AUTOMATED QUOTA DETERMINATION BASED ON RESOURCE SELECTION IN ONLINE CHARGING SYSTEMS

TECHNICAL FIELD

The present invention generally relates to communication networks and, more particularly, to mechanisms and techniques for resource selection.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc.

An example of how telecommunication services and products are provided to such devices will now be described with respect to a Charging and Billing system also known as an Online Charging System (OCS). In the OCS, the services that a customer can use, e.g., sending a Short Message Service (SMS) to another party or utilizing mobile data, is modelled as a service which is realized through a product specification and a product offering. A product offering is an item that a customer actually sees to purchase. This product offering can be a single product or a bundled product. Examples of single products include voice, data or SMS products. An example of a bundled service is an offering that allows 500 minutes of voice, 50 gigabytes (GB) of data and 200 SMS texts.

For any end user, there is a representation of the products and services within the OCS which can be in the form of an account that captures mapping of the assigned offerings with the actual resources that are allocated to an end user or subscriber.

In order to manage usage of services and to charge the customer based on the usage, an operator typically hosts an OCS in its network. This node or set of nodes is responsible for determining the requested usage, looking at the state of the account and making a determination of how much usage to grant to the user. This usage grant to the user can include the Granted Service Units (GSU) and a validity time (VT) for the GSUs. Additionally, not all available offerings are eligible for all usage requests, e.g., usage of a short message service (SMS) offering is not eligible for various data services. The procedure for determining which account resources are applicable for a particular service is referred to herein as resource selection and/or service selection.

Currently, there are standardized procedures for session charging with unit reservation, as shown for example in $3^{rd}$ generation partnership project (3GPP) technical specification (TS) 32.299 v 15.0.0 FIG. 6.3.5.1, which will now be described with respect to FIG. 1. FIG. 1 shows a charging trigger function (CTF) which is located on a network node or network element 2 which interfaces with an end user (or another network element) for communicating with the OCS 4. Initially, network element 2 receives a session initiation message, as shown in message 6, which is initiated by either the user or another network element (not shown).

In order to perform a Reserve Units operation for a number of units, which can be monetary or non-monetary units, the network element 2 sends a credit control request (CCR) message 8 to the OCS 4. The CCR message 8 includes a CC-Request-Type Attribute-Value-Pair (AVP) set to INITIAL_REQUEST. Additionally, if known, the network element 2 may include a Requested-Service-Unit (RSU) AVP (monetary or non-monetary units) in the request message 8.

If the service cost information is not received by the OCS 4, the OCS 4 determines the price of the desired service according to the service specific information received by issuing a rating request to a Rating Function. If the cost of the service is included in the request, the OCS 4 directly reserves the specified monetary amount and if the credit balance is sufficient, the OCS 4 reserves the corresponding amount from the user's account as represented by Perform Charging Control function 10.

Once the reservation has been made, the OCS 4 returns a credit control answer (CCA) message 12 with CC-Request-Type set to INITIAL_REQUEST to the network element 2 in order to authorize the service execution (Granted-Service-Unit and possibly Cost-Information indicating the cost of the service and Remaining-Balance Attribute-Value-Pairs (AVP) are included). The OCS 4 may return the Validity-Time (VT) AVP with value field set to a non-zero value. The OCS 4 may also indicate in the Low-Balance-Indication AVP that the subscriber account balance has fallen below a predefined threshold of this account. Content and/or service delivery can then start and the reserved units are concurrently controlled.

During session delivery 14, in order to perform Debit Units and subsequent Reserve Units operations, the network element 2 sends a CCR message 16 with CC-Request-Type AVP set to UPDATE_REQUEST, to report the units used and request additional units, respectively. The CCR message 16 is sent by the network element 2 between the INITIAL_REQUEST and TERMINATION REQUEST either on request of the Credit-Control application within the validity time or if the validity time is elapsed. If known, the network element 2 may include Requested-Service-Unit AVP (monetary or non-monetary units) in the CCR message 16. The Used-Service-Unit (USU) AVP is complemented in the CCR message 16 to deduct units from both the user's account and the reserved units, respectively.

During Perform Charging Control operation 18, the OCS 4 deducts the amount used from the user's account. If the service cost information is not received by the OCS 4, the OCS 4 determines the price of the desired service according to the service specific information received by issuing a rating request to a Rating Function. If the cost of the service is included in the request, the OCS 4 directly reserves the specified monetary amount. If the credit balance is sufficient, the OCS 4 reserves the corresponding amount from the user's account.

Once the deduction and reservation have been made, the OCS 4 returns a CCA message 20 with CC-Request-Type set to UPDATE_REQUEST to the network element 2 in order to allow the content and/or service delivery to continue (a new GSU AVP and possibly Cost-Information AVP indicating the cumulative cost of the service and Remaining-Balance AVP are included in the CCA message 20). The OCS 4 may include in the CCA message 20, the Final-Unit-Indication (FUI) AVP to indicate the final granted units. The OCS 4 may indicate in the Low-Balance-Indication AVP that the subscriber account balance has fallen below a predefined threshold of this account.

Session delivery 14 continues and the reserved units are concurrently controlled. At some point in time, the session is terminated, as represented by arrow 22, at the network element 2. When this occurs, the network element 2 sends a CCR message 24 with a CC-Request-Type AVP set to TERMINATION REQUEST to terminate the active Credit-Control session and report the used units. The OCS 4 deducts the amount used from the account as represented by Perform Charging Control block 26. Unused reserved units are released if applicable. The OCS 4 also acknowledges the reception of the CCR message 24 by sending CCA message 28 with CC-Request-Type AVP indicating TERMINATION REQUEST (and possibly Cost-Information AVP indicating the cumulative cost of the service and Remaining-Balance AVP) to the network element 2.

However, there are problems with the method described above with respect to FIG. 1 in that there is frequent signaling performed between the client (core network) and the OCS 4. This frequent signaling has a capacity impact for both the client as well as the OCS 4.

Quota determination can be a problem for a network operator to solve, since the allocation typically needs to be a careful compromise of competing factors. On one hand, the goal is to reduce network signaling by not having too many intermediate requests for additional service units but on the other hand the reduction of network signaling should not be at the expense of end user experience. That is, if too many units are allocated for one particular service as an initial service grant, then it might result in newer services or parallel services being denied more units and there may not be sufficient units for other services to consume. If too few units are initially allocated, then this can result in frequent signaling between the core network and the OCS 4 to obtain more units which can have a negative impact on processing capability in the network and or the OCS 4.

One solution for optimizing this signaling is described in U.S. Pat. No. 8,473,379. U.S. Pat. No. 8,473,379 describes embodiments relating to centralized unit determination that may be performed at a charging system, during the service unit granting process, in response to a request for service units received in association with an end user's charging session. However, the method associated with the signaling in U.S. Pat. No. 8,473,379 can require manual updates to the OCS 4 for each newly introduced offering. An example of this can be seen in FIG. 2, in which a configuration 2 of the quota determination ruleset logic is shown which is required for each and every resource that shall be considered as quota determination input. Also, this quota configuration 200 is not executed by the OCS 4 only once. Instead, the configuration 200 is updated each time that new resources are configured in the OCS 4. For example, FIG. 2 also shows how the configuration for Gift Social Package 202 was entered when this offering was introduced. Then, at another time, an entry was made for a similar offering, e.g., Social Plus Prepaid POS 204, and a similar configuration entry was required to be manually entered by the operator.

Over time, these configurations keep on growing and the risk of manual errors when adding to the configuration increases. Deploying this technique has resulted in issues with configuration maintainability and extensibility since the configuration has to repeat the same logic for many offerings. This can lead to potentially undesirable large configurations. Additionally, when the same logic has been repeated many times, it takes more effort to update the logic in all applicable locations. From a performance perspective, the large configuration 200 can also result in a reduction in performance when the configuration has to be traversed each time a quota decision was needed. In other words, as the size of the configuration 200 grows, the amount of processing time for decision making increases which can decrease overall system performance.

Thus, there is a need to provide methods and systems that overcome the above-described drawbacks associated with respect to configurations and quota decisions for resource selection associated with products and/or services provided by an operator.

SUMMARY

Embodiments allow for the reduction in the amount of time and effort required to update or generate a configuration when a new offering is introduced. In some scenarios, only a selection as to which quota determination rule should be applied for the new offering occurs. Additionally, when a service has been requested, only offerings that have been selected as being associated or applicable to the service need are processed by applying the quota determination rules. This can result in a simpler configuration of the quota determination ruleset logic as the logic does not need to consider if the offering would be applicable for the session or not, as that decision would already have been done in the previously performed resource selection step. In other words, the resources that are selected for rating (or reserving) are considered as an automatic input for quota determination.

According to an embodiment, there is a method for granting service units associated with a charging session for providing network service to an end user, the method including: receiving a request message for the network service; selecting one or more offerings associated with the received request message prior to applying quota determination rules, wherein each offering includes one or more associated resources; applying quota determination rules to the selected one or more offerings based on the associated resources; rating the service request based on the selected one or more offerings and the results of applying the quota determination rules, wherein the rating results in an assigned quota; and transmitting the assigned quota for the requested service, wherein the assigned quota includes the granted service units.

According to an embodiment, there is a communication node for granting service units associated with a charging session for providing a network service to an end user, the communication node including: a transceiver configured to receive a request message for the network service; a processor configured to select one or more offerings associated with the received request message prior to applying quota determination rules, wherein each offering includes one or more associated resources; the processor configured to apply quota determination rules to the selected one or more offerings based on the associated resources; the processor further being configured to rate the service request based on the selected one or more offerings and the results of applying the quota determination rules, wherein the rating results in an assigned quota; and the transceiver further being configured to transmit the assigned quota for the requested service, wherein the assigned quota includes the granted service units.

According to an embodiment, there is a computer-readable storage medium containing a computer-readable code that when read by a processor causes the processor to perform a method for granting service units associated with a charging session for providing a network service to an end user including: receiving a request message for the network service; selecting one or more offerings associated with the received request message prior to applying quota determination rules, wherein each offering includes one or more associated resources; applying quota determination rules to the selected one or more offerings based on the associated resources; rating the service request based on the selected one or more offerings and the results of applying the quota determination rules, wherein the rating results in an assigned quota; and transmitting the assigned quota for the requested service, wherein the assigned quota includes the granted service units.

According to an embodiment, there is an apparatus adapted to receiving a request message for the network service, selecting one or more offerings associated with the received request message prior to applying quota determination rules, wherein each offering includes one or more associated resources, applying quota determination rules to the selected one or more offerings based on the associated resources, rating the service request based on the selected one or more offerings and the results of applying the quota determination rules, wherein the rating results in an assigned quota; and transmitting the assigned quota for the requested service, wherein the assigned quota includes the granted service units.

According to an embodiment, there is an apparatus including: a first module configured to receive a request message for the network service; a second module configured to select one or more offerings associated with the received request message prior to applying quota determination rules, wherein each offering includes one or more associated resources; a third module configured to apply quota determination rules to the selected one or more offerings based on the associated resources; a fourth module configured to rate the service request based on the selected one or more offerings and the results of applying the quota determination rules, wherein the rating results in an assigned quota; and a fifth module configured to transmit the assigned quota for the requested service, wherein the assigned quota includes the granted service units.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 shows an example of a configuration for a telecommunication operator;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with current methods for performing quota decisions for resource selection associated with products and/or services provided by an operator. Embodiments described herein provide quota determination rules which are configured in the online charging system (OCS) with the rules being optionally attached to each offering when the offerings are configured in the OCS. These quota determination rules consider the resources associated each offering as an input. Prior to describing the various embodiments in detail, a simplified representation of the interactions between a network, an OCS and a provisioning system is now described with respect to FIG. 3.

Figure 3:
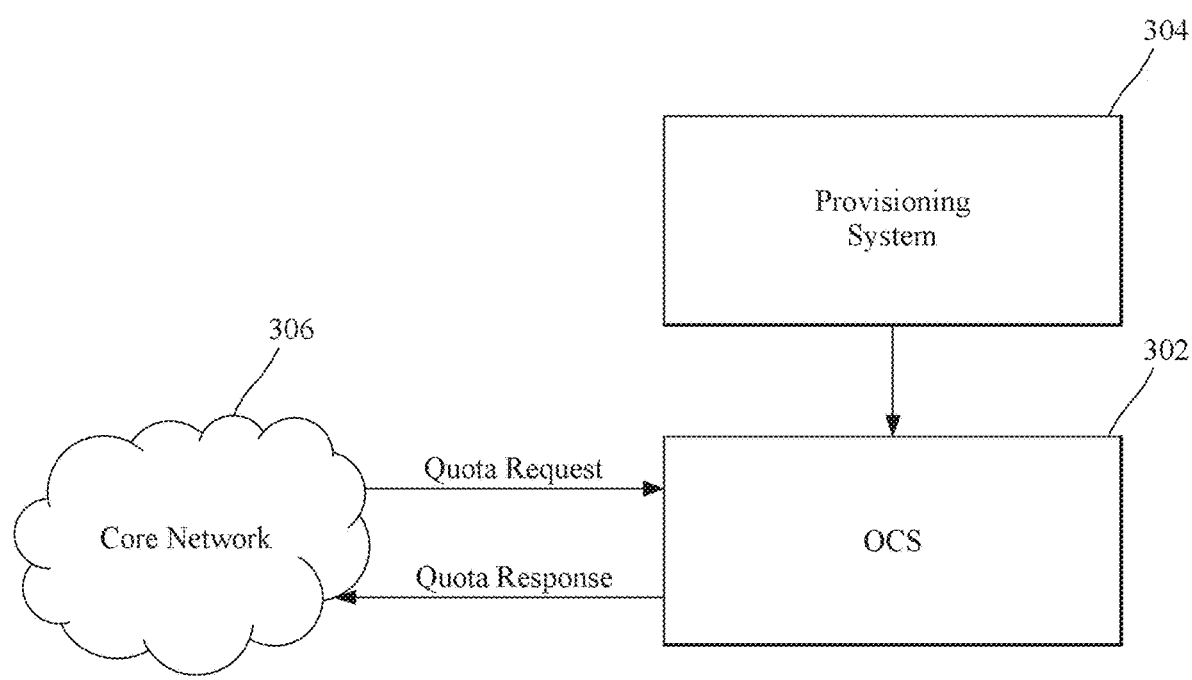
FIG. 3 illustrates interactions between an online charging system (OCS), a provisioning system and a core network according to an embodiment.

FIG. 3 shows the OCS 302, a provisioning system 304 and a core network 306. In this example, the provisioning system 304 is responsible for assigning or allocating resources to a subscriber provisioned in the OCS 302. The core network 306 represents the nodes in an operator's system that are responsible for interacting with the OCS 302, for requesting the units for consumption by the subscriber and for delivering services to end user devices (not shown). The OCS 302, in this example, is responsible for allocating or granting units for consumption. Additionally, the OCS 302 is a communication node (or nodes) which is able to execute various embodiments described below with respect to quota determination.

Embodiments described herein connect the two distinct operations of resource and quota allocation such that optimization is achieved on the communication flows thereby resulting in optimized signaling. To achieve this, quota determination rules are configured in the OCS 302 and these quota determination rules may then be attached to each offering when these offerings are configured in the OCS 302. As used herein, an offering describes an entity which has its own lifecycle and associated resources. An offering can be used to provide a service, e.g., voice or data for a more specialized service such as YouTube or Facebook. A quota as used herein defines an amount of granted service units (GSUs) and a validity time for using the GSUs, e.g., 1 gigabyte (GB) of data valid for 1 hour. Additionally, quota determination rules can be described as a ruleset including one or more rules associated with selecting a quota for an offering. As described herein, GSUs are the number of units granted for an interrogation in a session, i.e., the amount of resources that can be used until the next interrogation is sent towards the OCS 302, and associated resources for an offering describes the amount of resources a subscriber has available for future use.

One trait of these quota determination rules is that several offerings often have a same wanted behavior for quota determination. Thus, it is an option to only configure certain rules once and then, for each offering with this similar behavior, to select the applicable quota determination rule. This allows for a shorter processing time associated with executing the quota determination rule associated with an offering as the size of the configuration is small as compared to conventional systems in which there is only a single, overly large configuration which is executed.

According to an embodiment, the quota determination rules are evaluated for each charging request that desires to reserve units. The offerings that are valid for the current request are selected and thereby only the rules that have been selected for a specific offering are evaluated. An offering may have one resource, e.g., 1 gigabyte (GB) of data, or several resources, e.g., 100 short message service (SMS) and 1 GB of data, associated with the offering. When evaluating a rule, all resources associated with the offering are accessible for the evaluation with the quota that is determined by the rule then being used as input for the rating phase.

Figure 1:
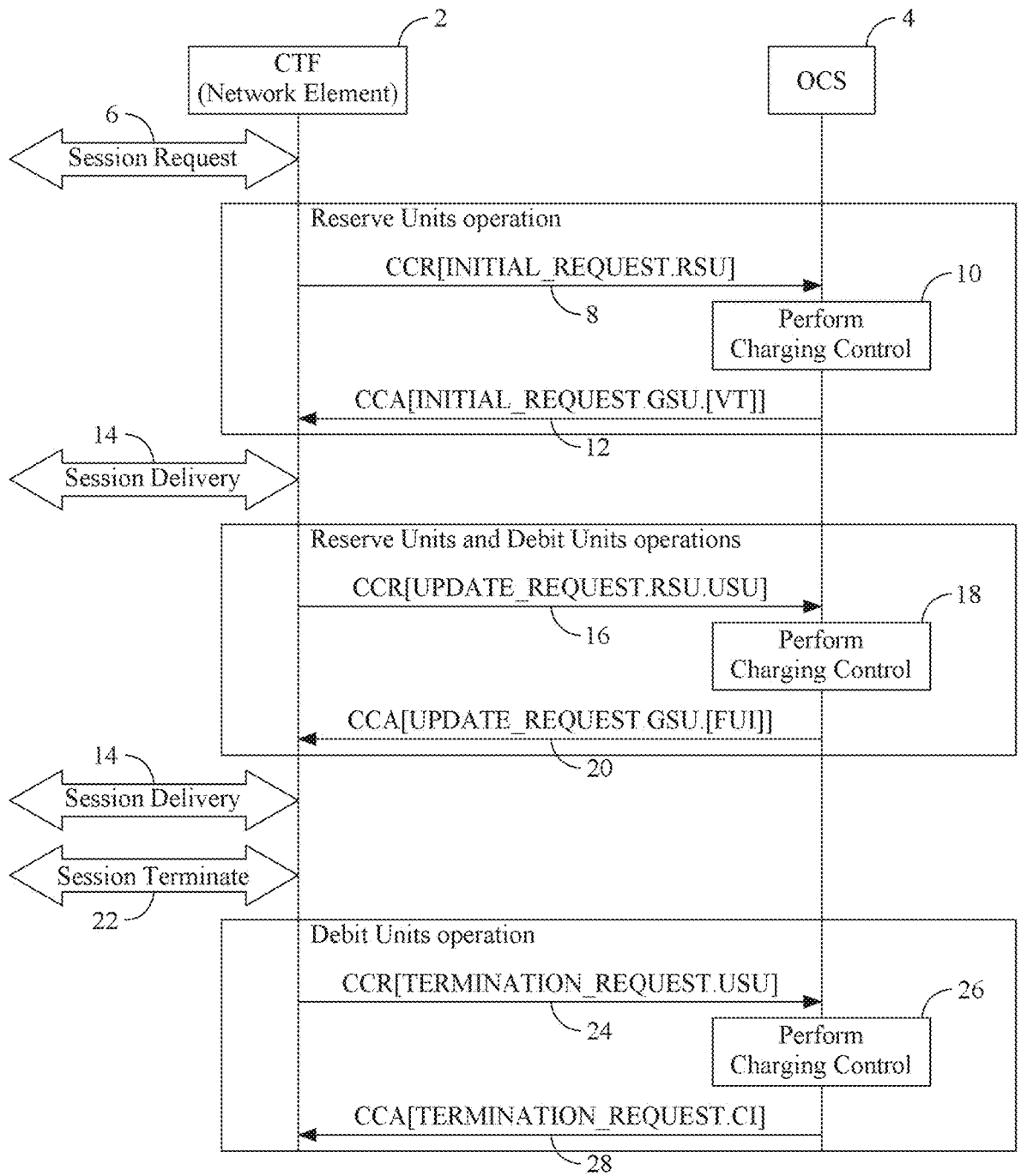
FIG. 1 illustrates steps associated with session charging with unit reservation per $3^{rd}$ generation partnership project (3GPP) technical specification (TS) 32.299.

According to embodiments, steps 10 and 18 associated with performing charging control as shown in FIG. 1, can be altered in that resources that are selected for rating as a part of performing charging control can be automatically considered as input(s) to quota determination logic. This differs from conventional methods in that conventional methods do not include the capability of only considering selected resources as selected resources are not conventionally input to quota determination logic.

According to an embodiment, these selected resources can be aggregated, e.g., by total available balances or units for all selected offerings and resources, for quota determination logic to allocate a much larger quota if there is a significant amount of available funds. Allocating the GSUs can be based on the units that are provisioned to the subscriber from the provisioning system. As there is a possibility to aggregate the units on provisioned and selected resources automatically, this results in optimized signaling as the network is informed how and when to come back for the selected resources based on a dynamic algorithm for further reservation requests.

For example, consider that Offering A and Offering B are provisioned for a subscriber with 100 and 200 units, respectively. The GSUs can then be assigned based on the aggregated units, e.g., 300 units. This is an optimization in the way units are granted based on a dynamic algorithm that considers the provisioned resources on the account, as well as which resources are selected for the requested service.

According to an embodiment, a validity time for the GSUs can be allocated based on the expiration time of provisioned resources. As there is a possibility to consider several such provisioned resources, the validity time could effectively be set to the resource that is going to expire latest in time. This can result in an optimization of signaling as the validity time could be set to a later and dynamic time period. Additionally, the network need not request resources based on a fixed or static time period when the resources are not consumed already by the subscriber.

Figure 4:
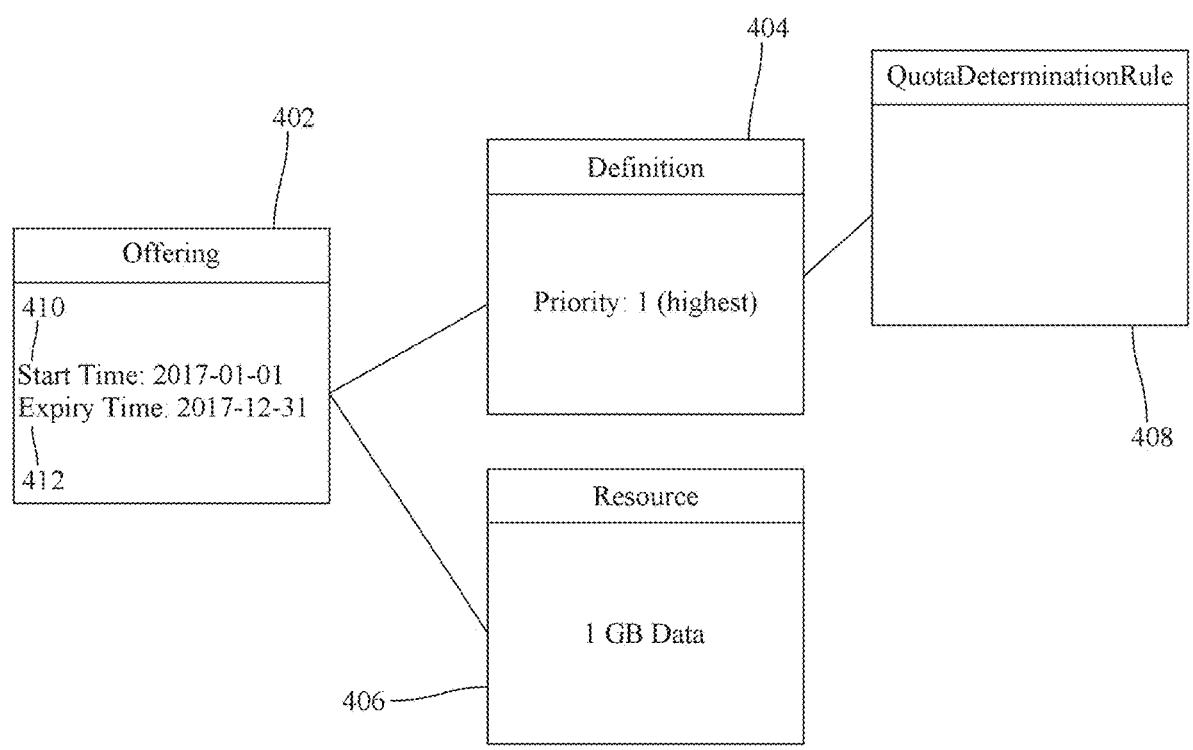
FIG. 4 depicts how an offering is modeled according to an embodiment.

According to an embodiment, FIG. 4 shows how an offering can be modeled including how a quota determination rule can be connected to the offering. FIG. 4 shows an offering 402, a definition block 404, one or more resources 406 and the quota determination rule 408. The offering 402 can include a start time 410 and an expiration time 412 which defines the time period during which the offering 402 is valid. The offering 402 is connected to a definition block 404 which includes the priority of the offering. The definition block 404 can also be connected to the quota determination rule 408 which includes one or more rules applicable for the offering 402. Additionally, the offering 402 can be linked to one or more different resources 406.

For example, looking at FIG. 4 in more detail, there can be an offering for the use of YouTube with the offering 402 being valid during calendar year 2017 as shown by the start time 410 and the expiration time 412. Additionally, the offering 402 selected when using YouTube can have the highest priority of all offerings (as shown in definition 404) presented to ensure that the YouTube offering is consumed before a general data offering is used. This could be defined in the quota determination rule 408 which will be explained in more detail below. The resource 406 associated with this offering 402 is 1 GB of data.

Figure 5:
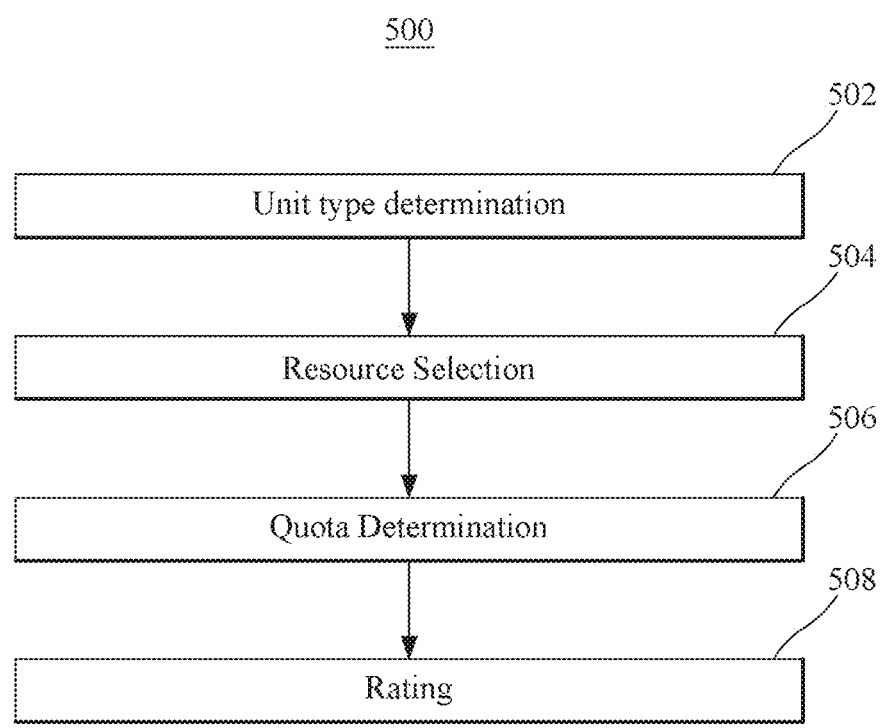
FIG. 5 shows a flow diagram for performing charging in the OCS according to an embodiment.

According to an embodiment, a flow diagram 500 for performing charging in an OCS when a Credit-Control-Request (CCR) message is received, which can also use the quota determination logic described herein, will now be described with respect to FIG. 5. Flow diagram 500 includes the steps of unit type determination 502, resource selection 504, quota determination 506 and rating 508. During the unit type determination step 502, the unit type, e.g., time, volume, and/or service specific units of the request is determined from parameters in the request. This is typically only performed for session setup, e.g., CC-Request-Type AVP set to INITIAL_REQUEST, and event charging, e.g., CC-Request-Type AVP set to EVENT_REQUEST. Additionally, the unit type is stored for the duration of the session.

During the resource selection step 504, applicable offerings with connected resources, which can be one or more resources, are selected based on subscriber resources and parameters found in the request, e.g., for a Facebook data request all offerings that are applicable for Facebook data can be selected, which could include both a specific Facebook offering as well as a general data offering.

According to an embodiment, for each offering selected during the resource selection step 504, a quota determination rule is applied to decide the applicable quota during step 506. Since resource selection has previously been performed in step 504, the quota determination step 506 knows the selected resources and then can apply quota determination logic based only on the resources applicable for this session for determining the quota. For example, there is no need in step 506 to consider any YouTube offerings when determining the quota for a Facebook session. Alternatively, the quota determination logic can use knowledge of the resources applicable for this session in conjunction with other information for determining the quota.

Based on the offerings selected in step 504 and the quota determined in step 506, the rating of the request is then performed in step 508. The rating step 508 reserves the quota specified in step 506 and allows the OCS to transmit a Credit-Control-Answer (CCA) back to the network. The CCA message typically includes at least granted service unit (GSU) information and a validity time associated with the offering.

Figure 6:
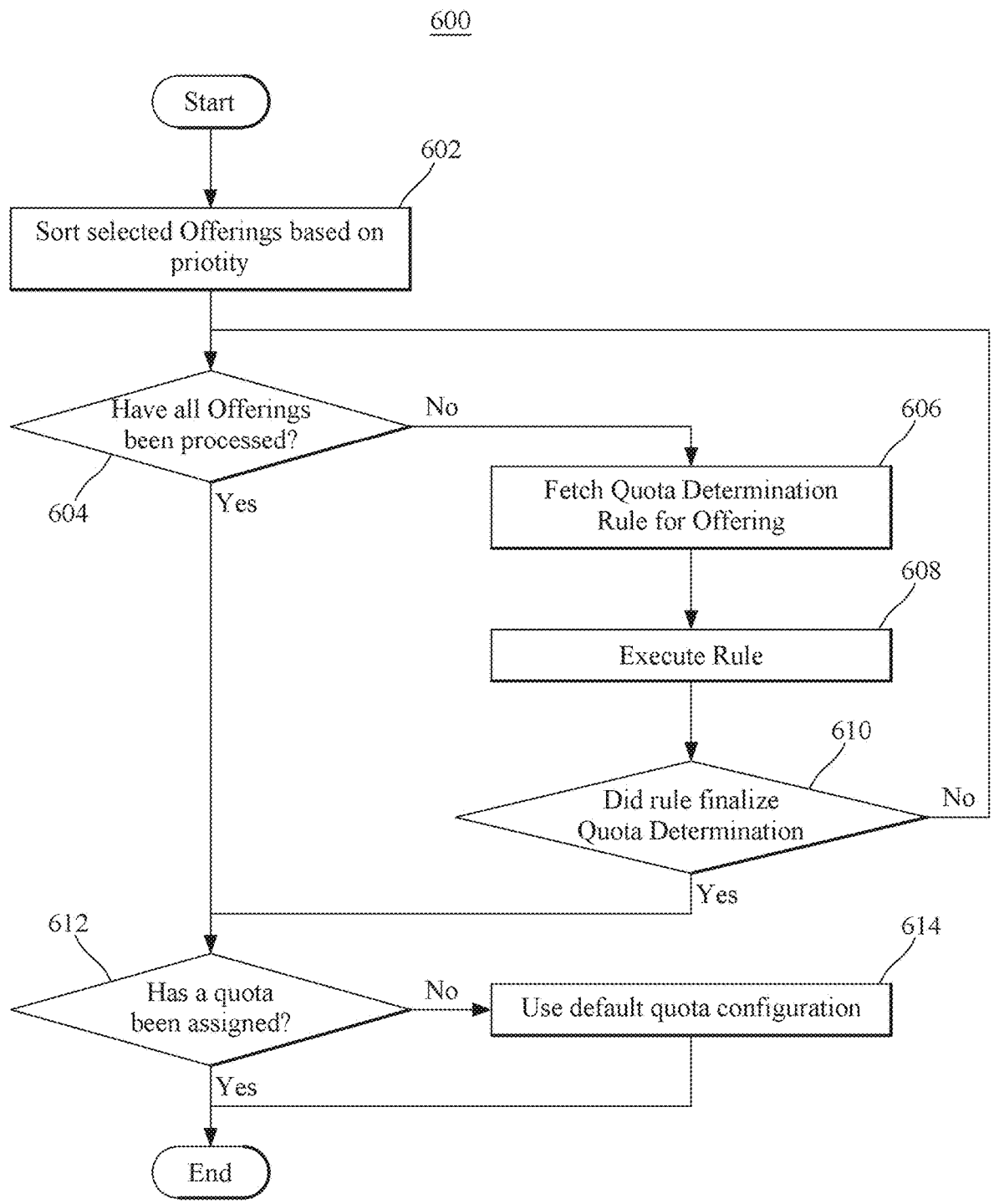
FIG. 6 shows a flow diagram of how a quota can be determined according to an embodiment.

According to an embodiment, a flow diagram 600 illustrating how quota determination for a plurality of offerings can be performed by an OCS will now be described with respect to FIG. 6. Initially, the selected offerings, which include their associated resources, are sorted based on their priority in step 602. The sorting is performed so that the order will be the same as the order used in the previously described rating step 508 of FIG. 5. This sorting to obtain the same order of offerings is useful as it allows the offerings that will be used in the rating step 508 to decide the applicable quota.

In step 604, a determination is made as to whether all of the offerings have been processed with respect to quota determination. If the outcome of step 604 is a no determination, then in step 606 a quota determination rule (or set of rules) is fetched for the current offering. In step 608, the fetched quota determination rule is executed. A determination is then made in step 610 to know if the execution of the fetched quota determination rule finalized quota determination. If the determination is a no, then the process returns to step 604.

If the outcome of the determination from either of steps 604 or 610 is a yes, then the process proceeds to step 612 which determines if a quota has been assigned. If a quota has been assigned, then the process shown in FIG. 6 is completed. If the outcome of step 612 is a no result, then a default quota configuration for the associated service is assigned and the process is considered to be completed. Default configurations can be stored based on the service, where the service is identified by the value of Service-Context-Id and Service-Identifier AVPs as defined in 3GPP TS 32.299. According to an embodiment, the outcome of completing the process shown in FIG. 6 is then used as input to the rating step 508.

Figure 7:
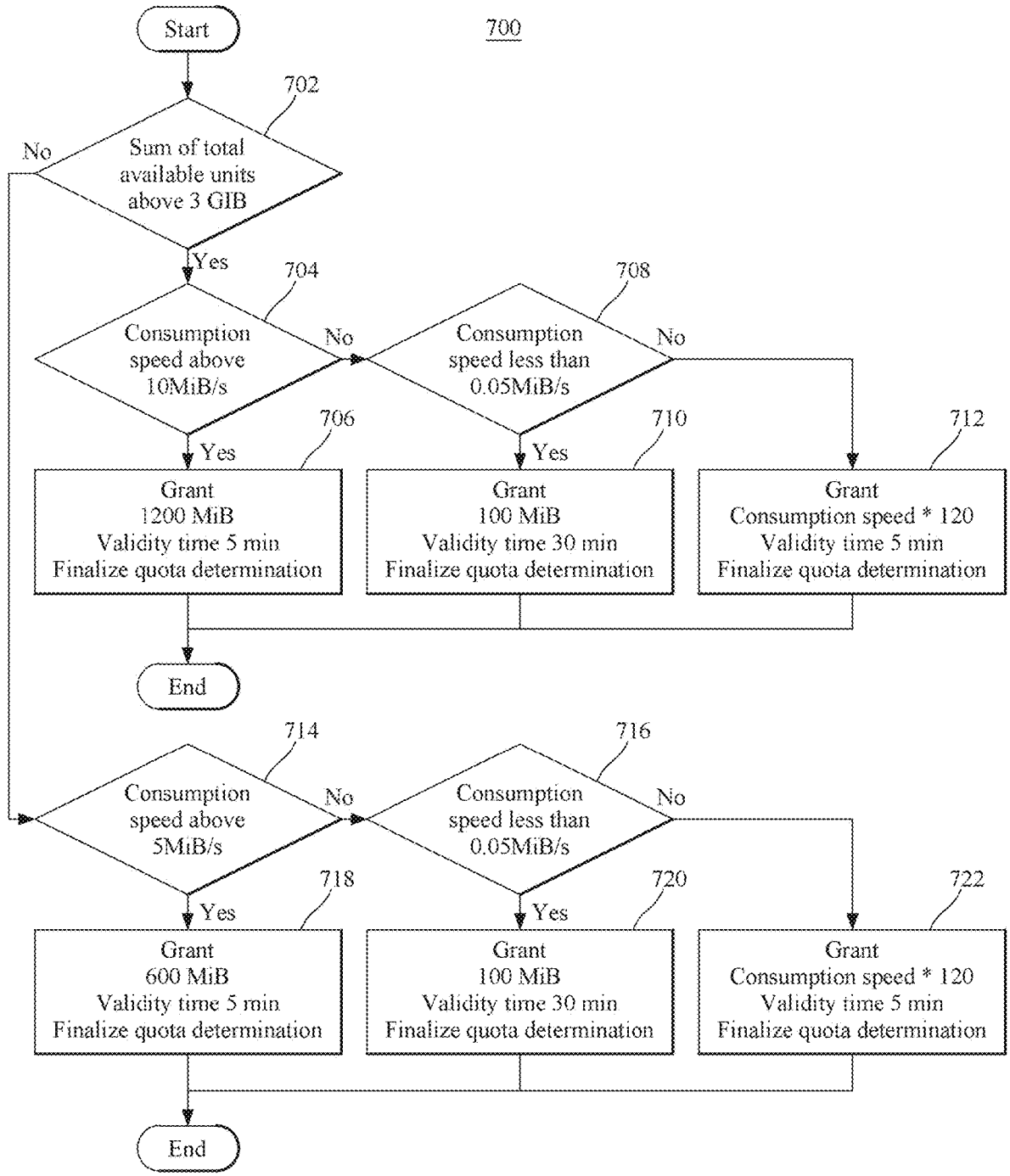
FIG. 7 illustrates a ruleset for a data offering according to an embodiment.

According to embodiments, rulesets can be created for offerings. Rules could be configured, for example, in a programming language like Python or JavaScript or configured in a graphical rules editor. Examples of two different rulesets can be seen in FIGS. 7 and 8. FIG. 7 illustrates a sample ruleset to achieve an interrogation every two minutes when the consumption speed of data or a service is above 0.05 mebibytes (MiB)/s and the ruleset will default to grant 100 MiB valid for 30 minutes when the consumption speed is lower. A maximum GSU of 1200 MiB or 600 MiB depending on the number of available units is also set, in this example, to make sure that a single service does not reserve all of the available service units. Additionally, the ruleset shown in FIG. 7 could be extended with more balance levels and with more levels of consumption speed.

Considering the ruleset 700 shown in FIG. 7 in more detail, in this example, consumption speed is the number of consumed units for the last interrogation divided by the length of the last interrogation. For a first interrogation, the consumption speed is considered to be zero and uses the default allocation of 100 MiB with a validity time of 30 minutes. Walking through the ruleset 700, in the first step 702, the process sums all available units for all selected offerings and if the sum total is above 3 gibibyte (GiB) proceed to decision step 704 else proceed to decision step 714. Additionally, as previously described above, resources have been selected for each offering prior to implementing ruleset 700 so as to be used in the determination steps shown in FIG. 7.

In step 704, the consumption speed is determined. If the consumption speed is above 10 MiB/s quota determination is finalized and a 1200 MiB grant with a validity time of 5 minutes is allowed as shown in block 706. If the determination from step 704 is a no, then in step 708 it is determined if the consumption speed is less than 0.05 MiB/s. If the consumption is less than 0.05 MiB/s then quota determination is finalized and a grant of 100 MiB with a validity time of 30 min is allowed as shown in block 710. If the consumption is not less than 0.05 MiB/s then quota determination is finalized and a grant data amount of consumption speed*120 with a validity time of 5 min is allowed as shown in block 712. Once any of blocks 706, 710 or 712 is applied, i.e., finalized, no further quota rules are applied.

Returning to step 702, if the sum of the total available units was determined to not be above 3 GiB then in step 714 it is determined if the consumption speed is above 5 MiB/s. If the consumption speed is above 5 MiB/s then quota determination is finalized and a 600 MiB grant with a validity time of 5 minutes is allowed, as shown in block 718. In step 714, if the consumption speed was determined to not be above 5 MiB/s then it is determined if the consumption speed is less than 0.05 MiB/s in step 716. If the consumption speed is less than 0.05 MiB/s then quota determination is finalized and a 100 MiB grant with a validity time of 30 minutes is allowed as shown in block 720. If the consumption speed is not less than 0.05 MiB/s then quota determination is finalized and a grant data amount of consumption speed*120 with a validity time of 5 min is allowed as shown in block 720. Once any of blocks 718, 720 or 722 is applied, i.e., finalized, no further quota rules are applied.

Figure 8:
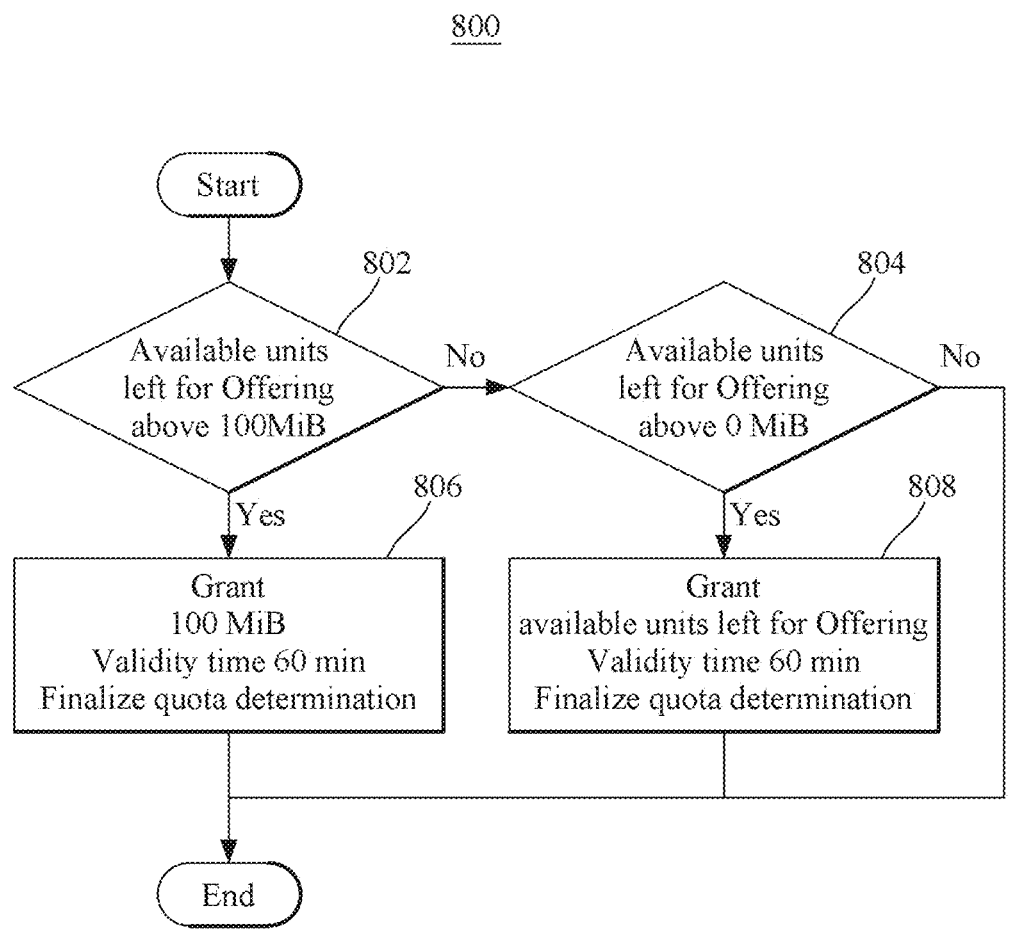
FIG. 8 depicts another ruleset for a data offering according to an embodiment.

According to an embodiment, FIG. 8 shows an example of how another ruleset could look for a data offering. The goal of this example rule is to fully consume an offering before starting to use the next offering. This can be useful if a policy such as highspeed data is connected to the offering and the policy should switch at the same time as the offering is depleted, or if an end user notification should be sent directly when the offering has been consumed. Considering the ruleset 800, in step 802 it is determined if the available units remaining for the current offering are above 100 MiB. If the available units remaining for the current offering is above 100 MiB, then quota determination is finalized and a 100 MiB grant with a validity time of 60 minutes is allowed as shown in block 806. If the available units remaining for the current offering is not above 100 MiB, the proceed to the determination step 804 which determines if the available units remaining for the current offering is above 0 MiB.

If, from step 804, it is determined that there are units remaining for the current offering, then then quota determination is finalized and a grant including the remaining units with a validity time of 60 minutes is allowed as shown in block 808. If, in step 804, it is determined that there are no units remaining for the current offering, then this ruleset 800 is completed and the next quota determination rule for the next selected offering is executed as previously described with respect to FIG. 6, i.e., perform step 604 as applicable.

Figure 2:
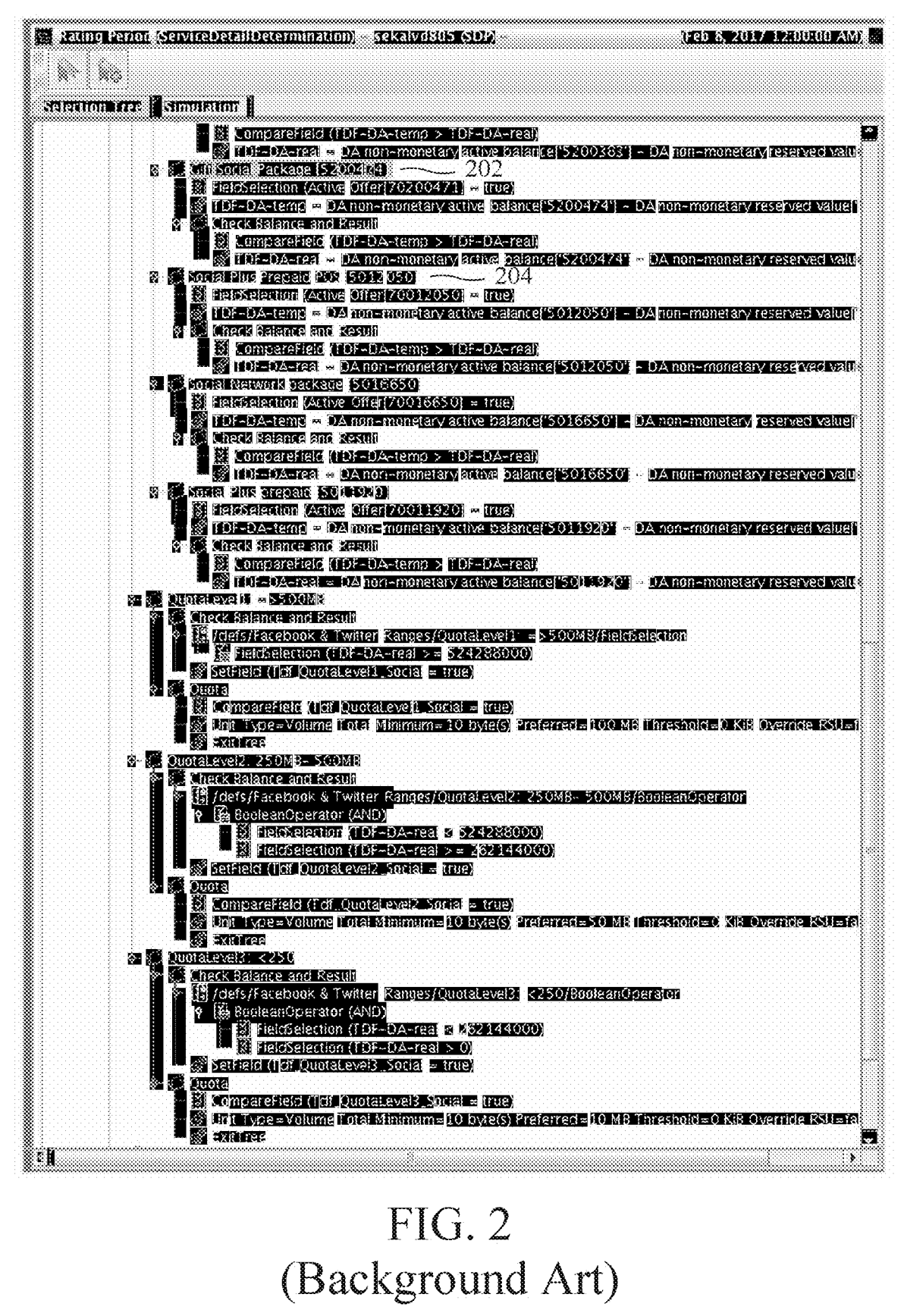
Figure 9:
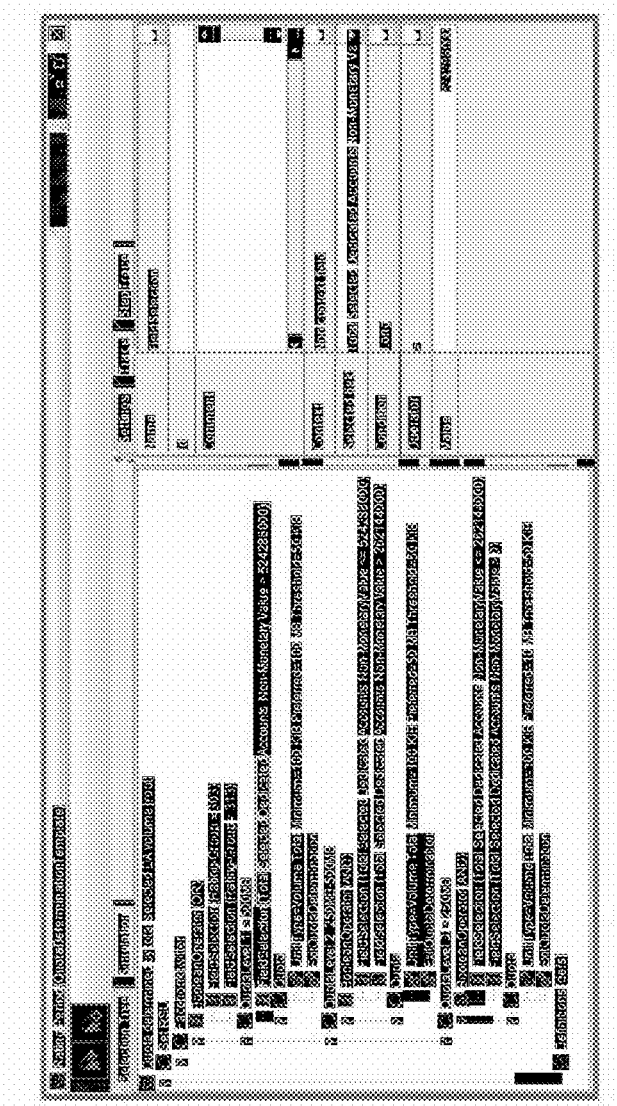
FIG. 9 illustrates a quota determination rule as a part of a configuration according to an embodiment.

Embodiments allow for having and using a plurality of rulesets which are more tailored to various offerings as compared to using a single larger configuration which includes all rules and applying it to every offering. An example of the single larger configuration 200 was illustrated and described with respect to FIG. 2. By way of contrast, FIG. 9 shows a more streamlined configuration of a quota determination rule 900 which, for example, would target new offerings using Facebook which indicates that this rule should be used for Facebook offerings and not all of the other options shown in the larger configuration 200.

Figure 10:
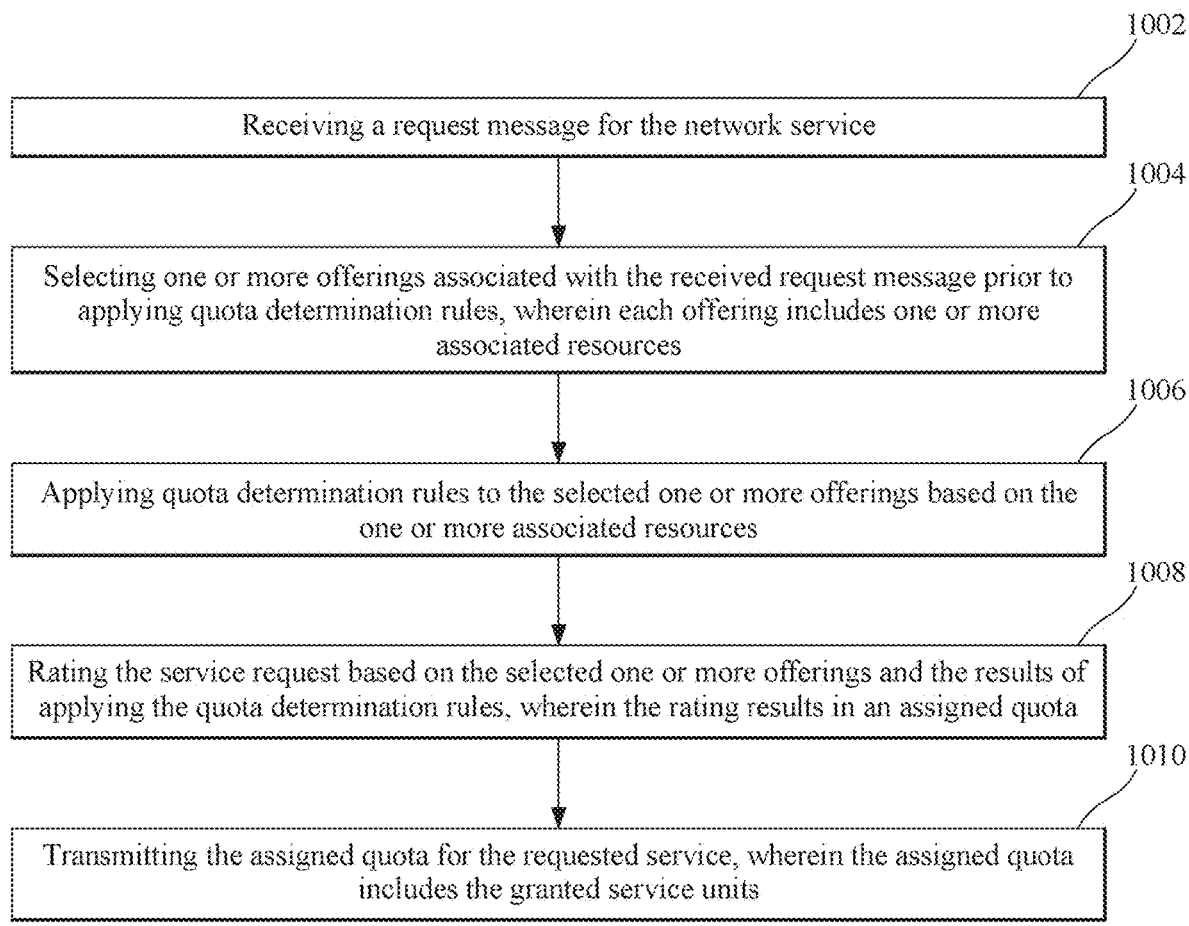
FIG. 10 shows a flowchart of a method for granting service units associated with a charging session for providing a network service to an end user according to an embodiment.

According to an embodiment there is a method for granting service units associated with a charging session for providing network service to an end user as shown in FIG. 10. The method includes: in step 1002, receiving a request message for the network service; in step 1004, selecting one or more offerings associated with the received request message prior to applying quota determination rules, wherein each offering includes one or more associated resources; in step 1006, applying quota determination rules to the selected one or more offerings based on the associated resources; in step 1008, rating the service request based on the selected one or more offerings and the results of applying the quota determination rules, wherein the rating results in an assigned quota; and in step 1010, transmitting the assigned quota for the requested service, wherein the assigned quota includes the granted service units.

Figure 11:
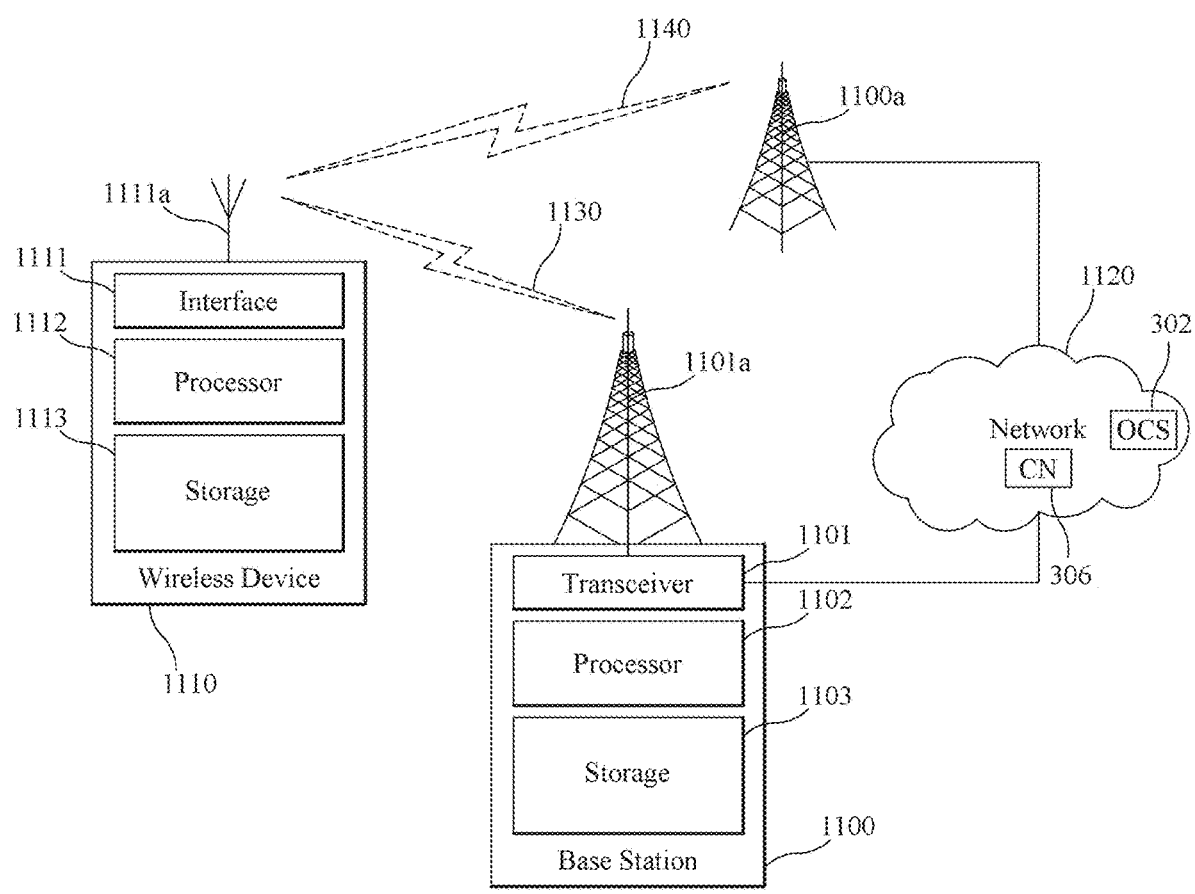
FIG. 11 depicts elements of a radiocommunication system according to an embodiment.
Figure 12:
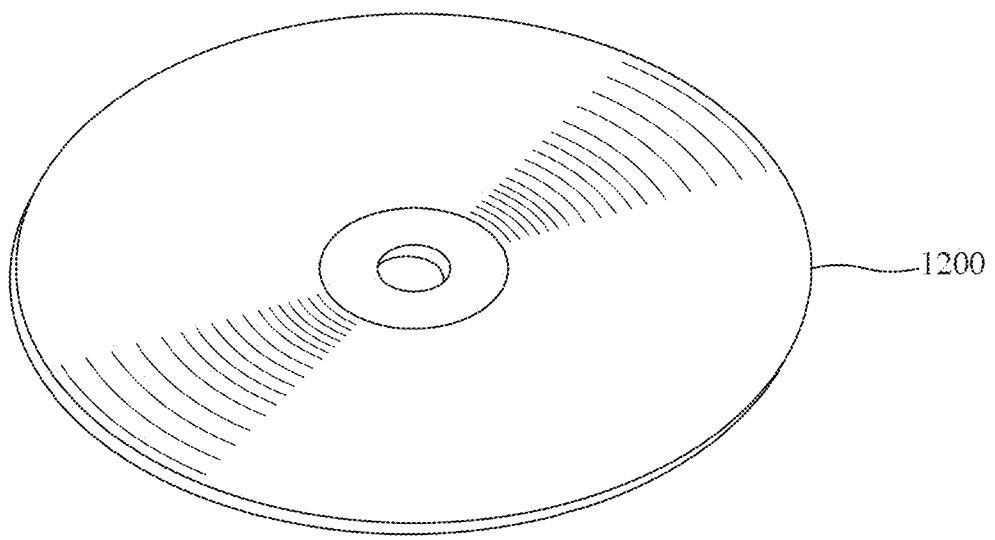
FIG. 12 depicts an electronic storage medium on which computer program embodiments can be stored.

FIG. 11 illustrates a wireless network comprising a more detailed view of network node 1100 and wireless device (WD) 1110, in support of various embodiments. These structural elements allow for the delivery of granted products and services to an end user, as well as, delivery of a request from an end user which triggers the execution of a configuration by the OCS 302. For simplicity, FIG. 11 only depicts network 1120, network nodes 1100 and 1100a, and WD 1110, i.e., a user equipment (UE). Network node 1100 comprises processor 1102, storage 1103, interface 1101, and antenna 1101a. Similarly, WD 1110 comprises processor 1112, storage 1113, interface 1111 and antenna 1111a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. Additionally, an OCS 302 and core network (CN) 306 are shown.

Network node 1100 comprises processor 1102, storage 1103, interface 1101, and antenna 1101a. These components are depicted as single boxes located within a single larger box. In practice however, a network node may comprise multiple different physical components that make up a single illustrated component (e.g., interface 1101 may comprise terminals for coupling wires for a wired connection and a radio transceiver for a wireless connection). As another example, network node 1100 may be a virtual network node in which multiple different physically separate components interact to provide the functionality of network node 1100 (e.g., processor 1102 may comprise three separate processors located in three separate enclosures, where each processor is responsible for a different function for a particular instance of network node 1100). Similarly, network node 1100 may be composed of multiple physically separate components (e.g., a NodeB component or gNB component and a RNC component, a BTS component and a BSC component, etc.), which may each have their own respective processor, storage, and interface components. In certain scenarios in which network node 1100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1100 may be configured to support multiple radio access technologies (RATs). In such embodiments, some components may be duplicated (e.g., separate storage 1103 for the different RATs) and some components may be reused (e.g., the same antenna 1101a may be shared by the RATs).

Processor 1102 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1100 components, such as storage 1103, network node 1100 functionality. For example, processor 1102 may execute instructions stored in storage 1103. Such functionality may include providing various wireless features discussed herein to wireless devices, such as WD 1110, including any of the features or benefits disclosed herein.

Storage 1103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1103 may store any suitable instructions, data or information, including software and encoded logic, utilized by network node 1100. Storage 1103 may be used to store any calculations made by processor 1102 and/or any data received via interface 1101.

Network node 1100 also comprises interface 1101 which may be used in the wired or wireless communication of signaling and/or data between network node 1100, network 1120, and/or WD 1110. For example, interface 1101 may perform any formatting, coding, or translating that may be needed to allow network node 1100 to send and receive data from network 1120 over a wired connection. Interface 1101 may also include a radio transmitter and/or receiver that may be coupled to or a part of antenna 1101a. The radio may receive digital data that is to be sent out to other network nodes or WDs via a wireless connection. The radio may convert the digital data into a radio signal having the appropriate channel and bandwidth parameters. The radio signal may then be transmitted via antenna 1101a to the appropriate recipient (e.g., WD 1110).

Antenna 1101a may be any type of antenna capable of transmitting and receiving data and/or signals wirelessly. In some embodiments, antenna 1101a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 1110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 1100 and/or other WDs via uplink signals or sidelink signals, respectively. WD 1110 comprises processor 1112, storage 1113, interface 1111, and antenna 1111*a*. Like network node 1100, the components of WD 1110 are depicted as single boxes located within a single larger box, however in practice a wireless device may comprises multiple different physical components that make up a single illustrated component (e.g., storage 1113 may comprise multiple discrete microchips, each microchip representing a portion of the total storage capacity).

Processor 1112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 1110 components, such as storage 1113, WD 1110 functionality. Such functionality may include providing various wireless features discussed herein, including any of the features or benefits disclosed herein.

Storage 1113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1113 may store any suitable data, instructions, or information, including software and encoded logic, utilized by WD 1110. Storage 1113 may be used to store any calculations made by processor 1112 and/or any data received via interface 1111.

Interface 1111 may be used in the wireless communication of signalling and/or data between WD 1110 and network node 1100. For example, interface 1111 may perform any formatting, coding, or translating that may be needed to allow WD 1110 to send and receive data from network node 1100 over a wireless connection. Interface 1111 may also include a radio transmitter and/or receiver that may be coupled to or a part of antenna 1111*a*. The radio may receive digital data that is to be sent out to network node 1101 via a wireless connection. The radio may convert the digital data into a radio signal having the appropriate channel and bandwidth parameters. The radio signal may then be transmitted via antenna 1111*a* to network node 1100.

Antenna 1111*a* may be any type of antenna capable of transmitting and receiving data and/or signals wirelessly. In some embodiments, antenna 1111*a* may comprise one or more omni-directional, sector or panel antennas operable to transmit/receive radio signals between 2 GHz and 66 GHz. For simplicity, antenna 1111*a* may be considered a part of interface 1111 to the extent that a wireless signal is being used.

The non-limiting term UE refers to any type of wireless device communicating with a network node in a cellular or mobile communication system over radio interface. Examples of UEs are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc. An example of a UE 1110 is illustrated in FIG. 11 including a processor 1102, radio transceiver 1104, and antenna 1106.

Various embodiments described herein refer in some fashion to nodes, e.g., OCS 302. In some embodiments the non-limiting network node (also interchangeably called as node) is more commonly used and it refers to any type of network node which directly or indirectly communicates with the UE. It can be radio network node or a node in the core network 306 or fixed part of the network such as the OCS 302. For example, it can be a network node serving the UE, a network node neighboring to the serving network node of the UE, any network node in the radio network or in the core network in wireless communication system in which UE operates. Examples of network nodes are base stations (BS), multi-standard radio (MSR) radio nodes such as MSR BS, eNode B (eNB), network controllers, radio network controllers, base station controllers, relay, donor node controlling relays, base transceiver stations (BTS), access points (AP), core network nodes (e.g. MSC, MME etc), O&M, OSS, SON, location server (e.g. E-SMLC), MDT etc. It is to be understood that network node/OCS 302 includes functional pieces similar to those shown for base station 1100.

Embodiments as described herein allow for the configuration used to introduce a new offering can be greatly reduced in size and effort, as in conventional systems each new offering required an update to the quota determination configuration. Instead, in some cases, embodiments allow for only selecting which quota determination rule should be applied to a new offering. Additionally, only the offerings that have been selected for the service is applicable for quota determination. This results in simpler configuration of the quota determination logic since it does not need to consider if the offering would be applicable for the session or not, that have instead already been performed by the same resource selection step that selects offerings applicable for rating. Embodiments also allow for resources that are associated with an offering are considered as automatic input for quota determination. Embodiments described herein can be executed at the OCS 302.

According to an embodiment, there is a method to connect the provisioned offerings with the quota determination mechanism in order to optimize the signaling between client, e.g., core network 306, and the OCS 302. This connection of provisioned resources with quota determination is dynamic and automatic in nature so as to result in much lesser configuration work and also to bring dynamicity to the value assigned to GSUs and validity time attribute-value-pairs (AVPs).

The disclosed embodiments provide methods and devices for performing quota decisions for resource selection associated with products and/or services provided by an operator. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments, e.g., the configurations and other logic associated with quota determination rules to include embodiments described herein, such as, the method associated with FIG. 10, may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for granting service units associated with a charging session for providing network service to an end user, the method comprising:
   receiving a request message for the network service;
   selecting one or more offerings associated with the received request message prior to applying quota determination rules, wherein each offering includes one or more associated resources;
   sorting the selected one or more offerings based on a predetermined priority;
   fetching quota determination rules for an offering among the selected one or more offerings;
   applying the fetched quota determination rules to the selected one or more offerings based on the associated resources;
   executing the fetched quota determination rules for the offering;
   rating the network service request based on the selected one or more offerings and the results of applying the fetched quota determination rules, wherein the rating results in an assigned quota; and
   transmitting the assigned quota for the requested network service, wherein the assigned quota includes the granted service units for a charging session providing the network service to the end user.

2. The method of claim 1, wherein the step of applying quota determination rules to the selected one or more offerings based on the associated resources further includes the following step:
   determining if the executed quota determination rules finalized a quota determination process.

3. The method of claim 1, wherein the received request message is a credit control request.

4. The method of claim 1, wherein the method is performed by an online charging system.

5. The method of claim 1, wherein the offering is a service which includes a validity time of usage and the one or more associated resources.

6. The method of claim 1, wherein the quota determination rule is based on a data consumption speed.

7. The method of claim 1, wherein a plurality of offerings use a same set of quota determination rules.

8. The method of claim 1, wherein the quota determination rules are based on the one or more associated resources, further wherein the one or more associated resources are resources which are made available for use in conjunction with the offering.

9. The method of claim 1, wherein the network service is one of a text service, a voice service or a video service.

10. The method of claim 1, wherein the fetching quota determination rules for an offering among the selected one or more offerings is performed based on the priority of the one or more offerings according to the sorting.

11. A communication node for granting service units associated with a charging session for providing a network service to an end user, the communication node comprising:
   a transceiver configured to receive a request message for the network service;
   a processor configured to select one or more offerings associated with the received request message prior to applying quota determination rules, wherein each offering includes one or more associated resources;
   the processor configured to sort the selected one or more offerings based on a predetermined priority;
   the processor configured to fetch quota determination rules for an offering among the selected one or more offerings;
   the processor configured to apply the fetched quota determination rules to the selected one or more offerings based on the associated resources;
   the processor configured to execute the fetched quota determination rules for the offering;
   the processor configured to rate the network service request based on the selected one or more offerings and the results of applying the fetched quota determination rules, wherein the rating results in an assigned quota; and
   the transceiver configured to transmit the assigned quota for the requested network service, wherein the assigned quota includes the granted service units for a charging session providing the network service to the end user.

12. The communication node of claim 11, wherein applying quota determination rules to the selected one or more offerings based on the associated resources further includes the communication node adapted to perform the following step:
   determining if the executed quota determination rules finalized a quota determination process.

13. The communication node of claim 11, wherein the received request message is a credit control request.

14. The communication node of claim 11, wherein the communication node is an online charging system.

15. The communication node of claim 11, wherein the offering is a service which includes a validity time of usage and the one or more associated resources.

16. The communication node of claim 11, wherein the quota determination rule is based on a data consumption speed.

17. The communication node of claim 11, wherein a plurality of offerings use a same set of quota determination rules.

18. The communication node of claim 11, wherein the quota determination rules are based on the one or more associated resources, further wherein the one or more associated resources are resources which are made available for use in conjunction with the offering.

19. The communication node of claim 11, wherein the network service is one of a text service, a voice service or a video service.

20. The communication node of claim 11, wherein the fetching quota determination rules for an offering among the selected one or more offerings is performed based on the priority of the one or more offerings according to the sorting.

21. A computer-readable storage medium containing a computer-readable code that when read by a processor causes the processor to perform a method for granting service units associated with a charging session for providing a network service to an end user comprising:
- receiving a request message for the network service;
- selecting one or more offerings associated with the received request message prior to applying quota determination rules, wherein each offering includes one or more associated resources;
- sorting the selected one or more offerings based on a predetermined priority;
- fetching quota determination rules for an offering among the selected one or more offerings;
- applying the fetched quota determination rules to the selected one or more offerings based on the associated resources;
- executing the fetched quota determination rules for the offering;
- rating the network service request based on the selected one or more offerings and the results of applying the fetched quota determination rules, wherein the rating results in an assigned quota; and
- transmitting the assigned quota for the requested network service, wherein the assigned quota includes the granted service units for a charging session providing the network service to the end user.

22. The computer-readable storage medium of claim 21, wherein the step of applying quota determination rules to the selected one or more offerings based on the associated resources further includes the following step:
- determining if the executed quota determination rules finalized a quota determination process.

23. The computer-readable storage medium of claim 21, wherein a plurality of offerings use a same set of quota determination rules.

24. The computer-readable storage medium of claim 21, wherein the fetching quota determination rules for an offering among the selected one or more offerings is performed based on the priority of the one or more offerings according to the sorting.

* * * * *